(12) United States Patent
Tan

(10) Patent No.: US 10,982,971 B2
(45) Date of Patent: Apr. 20, 2021

(54) METHOD AND APPARATUS FOR DETECTING BACKGROUND NOISE OF SENSOR

(71) Applicant: SHENZHEN GOODIX TECHOLOGY CO., LTD., Guangdong (CN)

(72) Inventor: Bo Tan, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 385 days.

(21) Appl. No.: 15/993,909

(22) Filed: May 31, 2018

(65) Prior Publication Data

US 2018/0274942 A1    Sep. 27, 2018

Related U.S. Application Data

(63) Continuation of application No. PCT/CN2016/104334, filed on Nov. 2, 2016.

(51) Int. Cl.
*G01D 3/036* (2006.01)
*G01D 3/032* (2006.01)

(52) U.S. Cl.
CPC ............. *G01D 3/036* (2013.01); *G01D 3/032* (2013.01)

(58) Field of Classification Search
CPC ................................. G01D 3/036; G01D 3/032
See application file for complete search history.

(56) References Cited

U.S. PATENT DOCUMENTS

| 4,423,634 A | 1/1984 | Audenard et al. |
| 2004/0095146 A1 | 5/2004 | Neumann et al. |
| 2004/0210411 A1* | 10/2004 | Koo ................ G01D 3/032 702/104 |
| 2010/0299083 A1 | 11/2010 | Jiang et al. |

(Continued)

FOREIGN PATENT DOCUMENTS

| CN | 101535769 A | 9/2009 |
| CN | 102346218 A | 2/2012 |

(Continued)

OTHER PUBLICATIONS

Chinese Office Action for Chinese Application Serial No. 201680001488.7 dated Apr. 18, 2019.

(Continued)

*Primary Examiner* — Stephanie E Bloss
(74) *Attorney, Agent, or Firm* — Heslin Rothenberg Farley & Mesiti P.C.

(57) ABSTRACT

A method and an apparatus for detecting a background noise of a sensor, relating to the technical field of electronics, are provided. The method for detecting a background noise of a sensor includes: receiving a sampling value output by the sensor and judging whether the sampling value falls within a background noise acceptable range; selecting the sampling value as a current background noise sampling value when the sampling value falls within the background noise acceptable range; and calculating a current background noise of the sensor according to a previous background noise and the current background noise sampling value of the sensor. Also provided is an apparatus for detecting a background noise of a sensor.

14 Claims, 5 Drawing Sheets

(56) References Cited

U.S. PATENT DOCUMENTS

2016/0299601 A1\* 10/2016 Yamazaki ............ G06F 3/04184
2018/0166481 A1\* 6/2018 Wei .................... H01L 27/14643
2018/0308981 A1\* 10/2018 Wu ..................... H01L 27/1214

FOREIGN PATENT DOCUMENTS

| CN | 102944765 | A | | 2/2013 |
| --- | --- | --- | --- | --- |
| CN | 103066925 | A | | 4/2013 |
| CN | 103424608 | A | | 12/2013 |
| CN | 103968910 | A | | 8/2014 |
| CN | 104013440 | A | | 9/2014 |
| CN | 104869519 | A | | 8/2015 |
| CN | 103424608 | | \* | 4/2016 |
| CN | 105894702 | A | | 8/2016 |

OTHER PUBLICATIONS

European Search Report issued by the European Patent Office for European Application No. 16920464.1 dated Feb. 13, 2019.
International Search Report (and English translation) and Written Opinion of the International Searching Authority for International Application No. PCT/CN2016/104334 dated Aug. 9, 2017.
Examination Report for Chinese Patent Application No. 201680001488.7 dated Sep. 3, 2018.

\* cited by examiner

METHOD AND APPARATUS FOR DETECTING BACKGROUND NOISE OF SENSOR

CROSS-REFERENCE TO RELATED APPLICATIONS

The present application is a continuation of international application No. PCT/CN2016/104334, filed on Nov. 2, 2016, which is hereby incorporated by reference herein in its entirety.

TECHNICAL FIELD

Embodiments of the present disclosure relate to the technical field of electronics, and more particularly to a method and an apparatus for detecting a background noise of a sensor.

BACKGROUND

With the continuous development of sensor technology, sensors are universally applied to various industries, and moreover, various novel sensors continuously emerge to provide convenience for people to acquire external information. A sensor converts, by means of an own physical property, a signal to another signal.

Usually, an output quantity of a sensor may be considered as superposition of two output components. An output component changes along with change of a valid input quantity, and can reflect the change of the valid input quantity. The other output component is referred to as a background noise of the sensor, which does not change along with the change of the valid input quantity; even when the valid input quantity is zero, this output component is not zero (namely the background noise is not zero), and the background noise will change along with the change of environment factors such as temperature, humidity and own material fatigue of the sensor. In the existing technology, a background noise of a sensor is normally measured by using a return-to-zero method. That is, a value, which is measured under the condition that a valid input quantity is zero, is taken as a background noise.

However, the return-to-zero method for measuring a background noise of a sensor is merely applicable to an input-controllable sensor that works in a relatively fixed environment during a working period. When the sensor works under an environment slowly changing (or rapidly changing) frequently, the sensor needs to be continuously calibrated to remove influence of the background noise. Apparently, it is difficult to apply the return-to-zero method to the sensor under this working environment. For example, various sensors in a mobile phone cannot be calibrated by isolation of an external input quantity, and these sensors need to continuously work, so that the return-to-zero method is inapplicable to measure the background noise of the sensors.

SUMMARY

An objective of the present disclosure is to provide a method and an apparatus for detecting a background noise of a sensor, capable of dynamically detecting the background noise of the sensor, such that a change value of the sensor along with environment changes can be updated to the background noise, thereby improving the accuracy of detecting a valid signal by the sensor.

To solve the foregoing technical problem, an embodiment of the present disclosure provides a method for detecting a background noise of a sensor, including: receiving a sampling value output by a sensor, and judging whether the sampling value falls within a background noise acceptable range; selecting the sampling value as a current background noise sampling value when the sampling value falls within the background noise acceptable range; and calculating a current background noise of the sensor according to a previous background noise and the current background noise sampling value of the sensor.

An embodiment of the present disclosure further provides an apparatus for detecting a background noise of a sensor, including: a judgment unit, configured to receive a sampling value output by a sensor, and judge whether the sampling value falls within a background noise acceptable range; a selection unit, configured to select, when the sampling value falls within the background noise acceptable range, the sampling value as a current background noise sampling value; and a calculation unit, configured to calculate a current background noise of the sensor according to a previous background noise and the current background noise sampling value of the sensor.

Compared with the existing technology, the embodiment provides a method for detecting a background noise of a sensor. When it is determined that a sampling value output by a sensor falls within a background noise acceptable range, a current background noise of the sensor is calculated according to the sampling value and a previous background noise. That is, the detection method of the embodiment can perform tracking detection when a background noise of a sensor changes along with environment changes, such that a change value of the sensor along with the environment changes is updated to the background noise, and the accuracy of a current background noise is improved, thereby improving the accuracy of outputting a valid sampling value by the sensor.

In addition, in the step of calculating a current background noise of the sensor according to a previous background noise and the current background noise sampling value of the sensor, a calculation formula for the current background noise is: $Base0=Base1/N1+Input0/N2$, $1/N1+1/N2=1$, where $Base0$ is representative of the current background noise, $Base1$ is representative of the previous background noise, $Input0$ is representative of the current background noise sampling value, $1/N1$ is representative of a weight corresponding to the previous background noise, and $1/N2$ is representative of a weight corresponding to the current background noise sampling value. In the present embodiment, a formula of calculating a current background noise is provided, and a change value of a sensor along with environment changes can be updated to a background noise according to a certain weight, such that the detected background noise is a current latest value.

In addition, an upper boundary value of the background noise acceptable range is the sum of the previous background noise sampling value and a half of a preset background noise channel width, and a lower boundary value of the background noise acceptable range is a difference between the previous background noise sampling value and the half of the background noise channel width. In the present embodiment, a mode of setting a background noise acceptable range is provided.

In addition, a calculation formula for the background noise channel width is: $W=2*(a+n\sigma)$, where $W$ is the background noise channel width, $a$ is an environment change limiting speed between two samplings, $\sigma$ is representative of normal distribution of a background noise, and n is a natural number meeting a safety margin demand. In the present embodiment, a mode of calculating the background noise channel width is provided.

In addition, the method for detecting a background noise of a sensor further comprises: when the sampling value does not fall within the background noise acceptable range, selecting the previous background noise sampling value as the current background noise sampling value. In the present embodiment, a specific embodiment for a situation in which a sampling value does not fall within a background noise acceptable range is provided.

BRIEF DESCRIPTION OF THE DRAWINGS

One or more embodiments of the present disclosure make exemplary descriptions by means of figures in the drawings corresponding thereto, these exemplary descriptions do not form limits to the embodiments, elements having the same reference numbers in the drawings are expressed as similar elements, and figures in the drawings do not form proportional limits unless otherwise stated.

DETAILED DESCRIPTION

To further clarify the objectives, technical solutions and advantages of the embodiments of the present disclosure, each embodiment of the present disclosure will be elaborated hereinbelow in conjunction with the drawings in detail. However, it is understandable to those of ordinary skill in the art that many technical details are provided for a reader to better understand the present disclosure in each embodiment of the present disclosure. However, even in the absence of these technical details and various changes and modifications based on each of the following embodiments, the technical solution claimed in the present application may be implemented.

Figure 1:
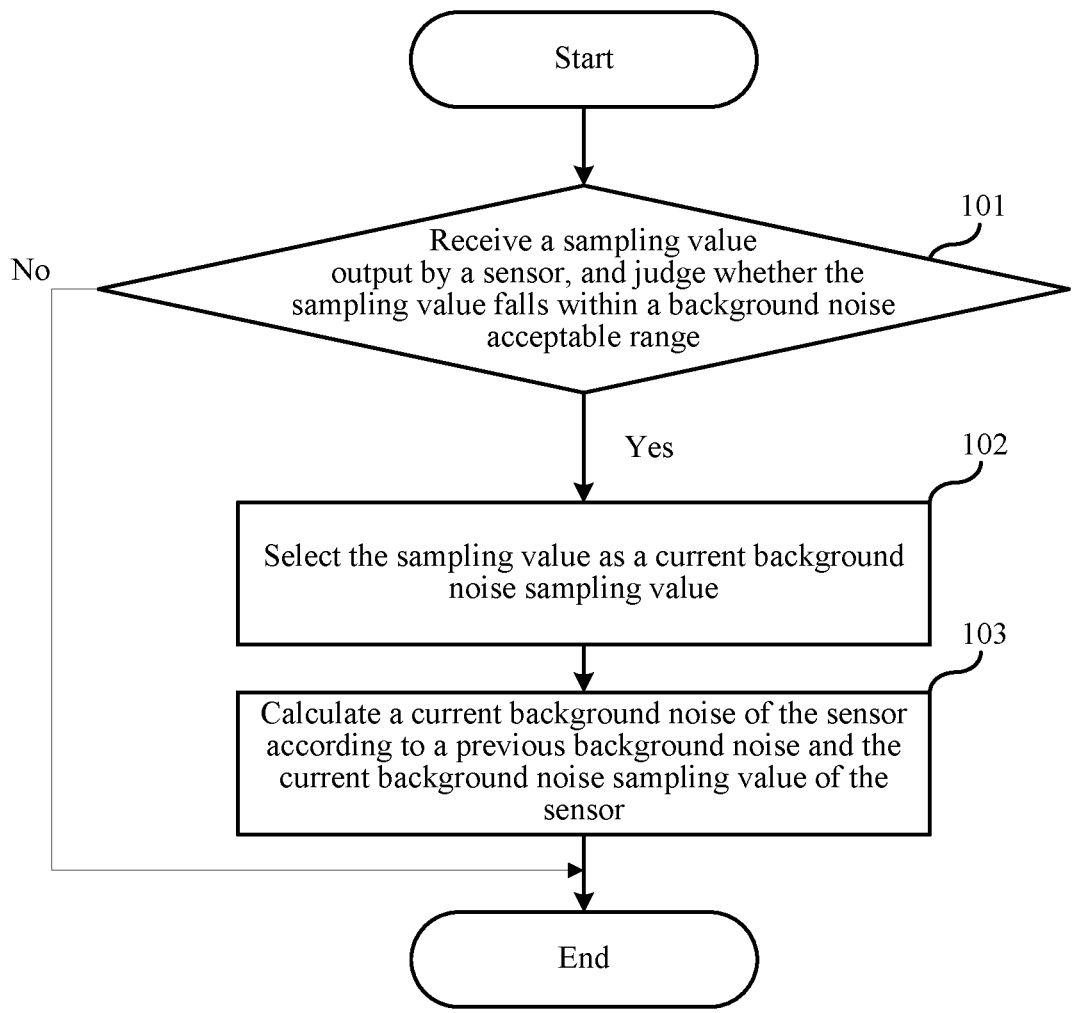
FIG. 1 is a specific flowchart of a method for detecting a background noise of a sensor according to a first embodiment.

The first embodiment of the present disclosure relates to a method for detecting a background noise of a sensor, which is applied to a sensor. A specific flow is as shown in FIG. 1, and includes the following steps.

In step 101, a sampling value output by the sensor is received, and it is judged whether the sampling value falls within a background noise acceptable range. If so, step 102 is executed, and otherwise, the flow is directly ended.

In the present embodiment, the sampling value output by the sensor serves as an input sampling value for detecting a background noise of the sensor. When the sensor does not have a valid input signal, the sensor outputs the background noise.

In the present embodiment, an upper boundary value of the background noise acceptable range is a sum of a previous background noise sampling value and a half of a preset background noise channel width; a lower boundary value of the background noise acceptable range is a difference between the previous background noise sampling value and a half of the background noise channel width.

Herein, a calculation formula for the background noise channel width is: $W=2*(a+n\sigma)$, where $W$ is the background noise channel width, $a$ is an environment change limiting speed between two samplings, $\sigma$ is representative of a normal distribution variance of a background noise (an own noise of a sampling signal input in the sensor and a noise introduced in a conversions process of the sensor are finally reflected on $\sigma$), and $n$ is a natural number meeting a safety margin demand. Thus, the present embodiment may preset the background noise channel width according to the foregoing formula, the value of the preset background noise channel width may be specifically set according to a working environment of the sensor, and the present embodiment will not make any limits thereto.

Figure 2:
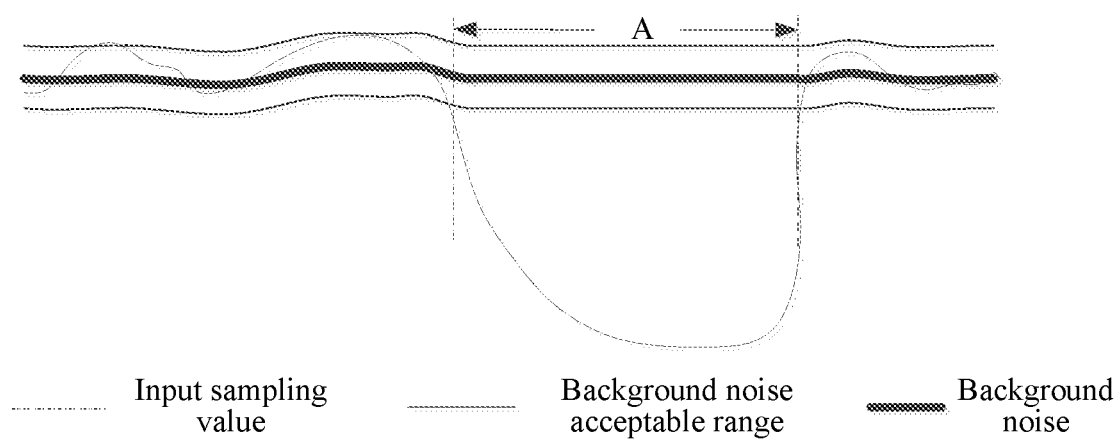
FIG. 2 is a principle diagram of the method for detecting a background noise of a sensor according to the first embodiment.

Exemplarily, as shown in FIG. 2, when the input sampling value is greater than or equal to the lower boundary value, and smaller than or equal to the upper boundary value, it may be determined that the sampling value falls within the background noise acceptable range. If the sampling value is smaller than the lower boundary value or greater than the upper boundary value, it may be determined that the sampling value does not fall within the background noise acceptable range. For example, in a stage A, the input sampling value is smaller than the lower boundary value, and apparently, the current sampling value does not fall within the background noise acceptable range.

In step 102, the sampling value is selected as a current background noise sampling value.

In the present embodiment, when a sampling value falls within the background noise acceptable range, that is, the sampling value fluctuates within the background noise acceptable range, the sampling value is taken as a current background noise sampling value for updating a current background noise of the sensor.

In step 103, a current background noise of the sensor is calculated according to a previous background noise and the current background noise sampling value of the sensor.

In the present embodiment, a sampling period may be preset, such that the sensor may periodically and automatically output a sampling value, and the background noise is detected based on the preset sampling period. The preset period may be set according to an actual working condition of the sensor, and the present embodiment does not make any limits thereto.

Herein, the previous background noise is a background noise of the sensor, detected in a previous period. In the present embodiment, a user may preset a relationship among a current background noise, a previous background noise and a current background noise sampling value according to an actual requirement, so as to calculate a current background noise.

In the present embodiment, when it is determined that a sampling value output by a sensor falls within a background noise acceptable range, a current background noise of the sensor is calculated according to the sampling value and a previous background noise. That is, the detection method of the present embodiment can perform tracking detection when the background noise of the sensor changes along with environment changes, such that the accuracy of a current background noise is improved, thereby improving the accuracy of outputting a valid sampling value by the sensor. Moreover, the present embodiment can periodically detect the sampling value output by the sensor, namely can intermittently find an appropriate time point to update the background noise during the normal working period of the sensor, thereby avoiding influence on normal working of the sensor.

The step divisions above for the method are only used for clear description. During implementation, the steps may be combined into one step, or some steps may be split into a plurality of steps, which fall within the scope of protection of the present disclosure as long as they have the same logical relationship. The key designs, in which insignificant modifications are added to an algorithm or flow or insignificant designs are introduced, but the algorithm and flow are not changed, fall within the scope of protection of the present disclosure.

The second embodiment of the present disclosure relates to a method for detecting a background noise of a sensor. The second embodiment is mainly detailed on the basis of the first embodiment as follows. In the second embodiment of the present disclosure, in the step of calculating the current background noise of the sensor according to the previous background noise of the sensor and the current background noise sampling value, the current input value and the previous input value are accumulated according to different weights to obtain the current background noise.

In the present embodiment, a provided calculation formula for the current background noise is:

$$Base0 = Base1/N1 + Input0/N2,$$

$$1/N1 + 1/N2 = 1; \quad (1),$$

where Base0 is representative of the current background noise, Base1 is representative of the previous background noise, Input0 is representative of the current background noise sampling value, $1/N1$ is representative of a weight corresponding to the previous background noise, and $1/N2$ is representative of a weight corresponding to the current background noise sampling value.

It should be noted that the values of the weights $1/N1$ and $1/N2$ are associated with a working environment of the sensor, the type of the sensor and an actual demand in the present embodiment, and may be specifically set according to an actual situation. The present embodiment does not make any limits thereto.

Specifically, Base1 in the calculation formula (1) is expanded again to obtain an expression of a current background noise:

$$Base0 = (Base2/N1 + Input1/N2)/N1 + Input0/N2 \quad (2).$$

Base2 in the expression (2) is expanded again to obtain an expression of a current background noise:

$$Base0 = ((Base3/N1 + Input2/N2)/N1 + Input1/N2)/N1 + Input0/N2 \quad (3).$$

The expression (3) is converted to:

$$Base0 = Base3/(N1*N1*N1) + Input2/(N2*N1*N1) + Input1/(N2*N1)/N1 + Input0/N2 \quad (4).$$

By parity of reasoning, apparently, from the expression (4), it can be seen that the current background noise is an accumulated sum of the current input value Input0 and previous input values (Input1, Input2, InputN−1, N being an integer greater than 2) according to different weights.

Compared with the first embodiment, the present embodiment provides a calculation mode of a current background noise. That is, a current background noise sampling value and a previous background noise of a sensor are averaged according to a certain weight distribution, so that a change value of the sensor along with environment changes is updated to a background noise, and the detected background noise is a current latest value.

Figure 3:
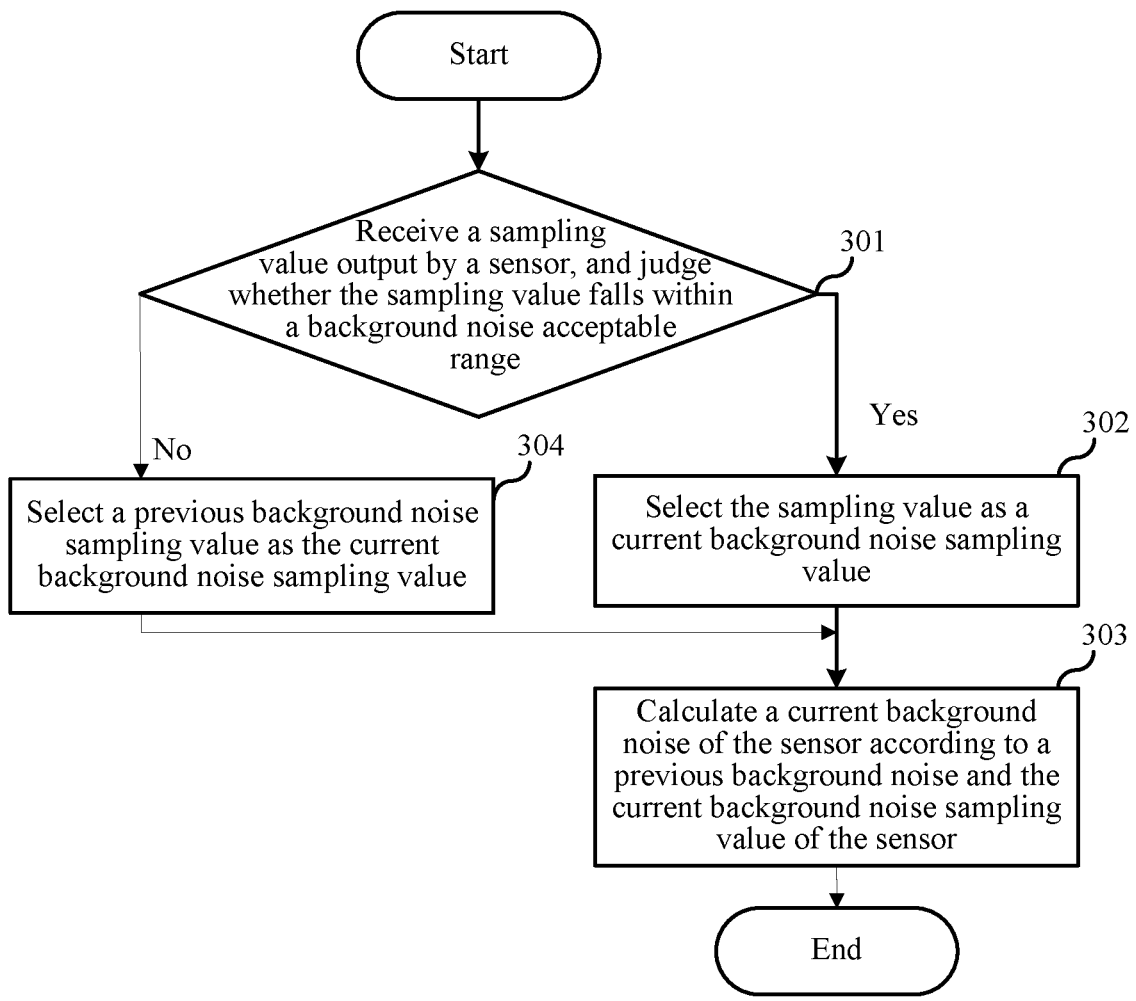
FIG. 3 is a specific flowchart of a method for detecting a background noise of a sensor according to a third embodiment.

The third embodiment of the present disclosure relates to a method for detecting a background noise of a sensor. The third embodiment is mainly improved on the basis of the first embodiment as follows. In the third embodiment of the present disclosure, as shown in FIG. 3, when it is determined that a sampling value does not fall within a background noise acceptable range, a previous background noise sampling value is selected as a current background noise sampling value.

The steps 301 to 303 in the present embodiment are identical to the steps 101 to 103 in the first embodiment, and will not be elaborated herein. A step 304 is added to the present embodiment. The method for detecting a background noise of a sensor in the present embodiment, as shown in FIG. 3, is specifically as follows.

In step 304, a previous background noise sampling value is selected as a current background noise sampling value.

Compared with the first embodiment, in the present embodiment, when a sampling value does not fall within a background noise acceptable range, a previous background noise sampling value is directly selected as a current background noise sampling value without re-judgment. When the method for detecting a background noise of a sensor in the present embodiment is applied to software, workloads are alleviated, and power consumption is reduced.

Figure 4:
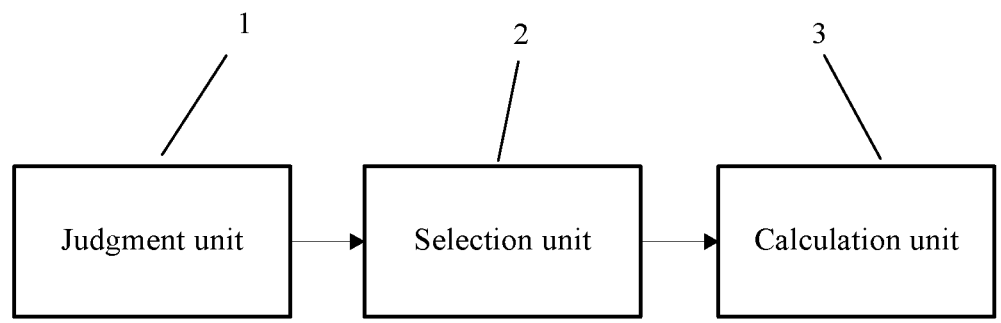
FIG. 4 is a block diagram of an apparatus for detecting a background noise of a sensor according to a fourth embodiment.

The fourth embodiment of the present disclosure relates to an apparatus for detecting a background noise of a sensor. As shown in FIG. 4, the apparatus for detecting a background noise of a sensor includes a judgment unit 1, a selection unit 2 and a calculation unit 3.

The judgment unit 1 is configured to receive a sampling value output by a sensor, and judge whether the sampling value falls within a background noise acceptable range.

The selection unit 2 is configured to select, when the sampling value falls within the background noise acceptable range, the sampling value as a current background noise sampling value.

In the present embodiment, an upper boundary value of the background noise acceptable range is a sum of a previous background noise sampling value and a half of a preset background noise channel width; a lower boundary value of the background noise acceptable range is a difference between the previous background noise sampling value and a half of the background noise channel width.

Herein, a calculation formula for the background noise channel width is: $W = 2*(a + n\sigma)$, where W is representative of the background noise channel width, a is representative of an environment change limiting speed between two samplings of the sensor, $\sigma$ is representative of normal distribution of a background noise, and n is representative of a natural number meeting a safety margin demand.

The calculation unit 3 is configured to calculate a current background noise of the sensor according to a previous background noise and the current background noise sampling value of the sensor.

Actually, in the present embodiment, a processor may implement functions implemented by the judgment unit 1, the selection unit 2 and the calculation unit 3. During practical application, selection may be set according to an actual situation, and the present embodiment does not make any limits thereto.

Compared with the existing technology, the present embodiment provides an apparatus for detecting a background noise of a sensor, applicable to the method for detecting a background noise of a sensor provided in the embodiments of the present disclosure.

It is not difficult to find out that the present embodiment is an apparatus embodiment corresponding to the first embodiment and the present embodiment may be implemented in fit with the first embodiment. Relevant technical details mentioned in the first embodiment are still valid in the present embodiment, and will not be elaborated here in order to reduce repetitions. Correspondingly, relevant technical details mentioned in the present embodiment may also be applied to the first embodiment.

The fifth embodiment of the present disclosure relates to an apparatus for detecting a background noise of a sensor. The fifth embodiment is mainly detailed on the basis of the fourth embodiment as follows. A calculation mode of a current background noise is provided.

In the present embodiment, when the calculation unit calculates the current background noise according to the previous background noise and the current background noise sampling value, a calculation formula for the current background noise is:

$$Base0 = Base1/N1 + Input0/N2,$$

$$1/N1 + 1/N2 = 1;$$

where Base0 is representative of the current background noise, Base1 is representative of the previous background noise, Input0 is representative of the current background noise sampling value, and 1/N1 and 1/N2 are respectively representative of weights corresponding to the previous background noise and the current background noise sampling value. That is, the calculation mode provided in the present embodiment can update a change value of a sensor along with environment changes to a background noise according to a certain weight, such that the detected background noise is a current latest background value.

Compared with the fourth embodiment, the present embodiment provides a calculation mode of a current background noise. Moreover, the calculation mode averages a current background noise sampling value, a previous background noise sampling value and a previous background noise value of a sensor according to a certain weight distribution, has a certain smooth filtering function when updating a change value of a sensor along with environment changes to a background noise, and smooths a system noise, such that the detected background noise is more accurate.

It is not difficult to find out that the present embodiment is an apparatus embodiment corresponding to the second embodiment and the present embodiment may be implemented in fit with the second embodiment. Relevant technical details mentioned in the second embodiment are still valid in the present embodiment, and will not be elaborated here in order to reduce repetitions. Correspondingly, relevant technical details mentioned in the present embodiment may also be applied to the second embodiment.

Figure 5:
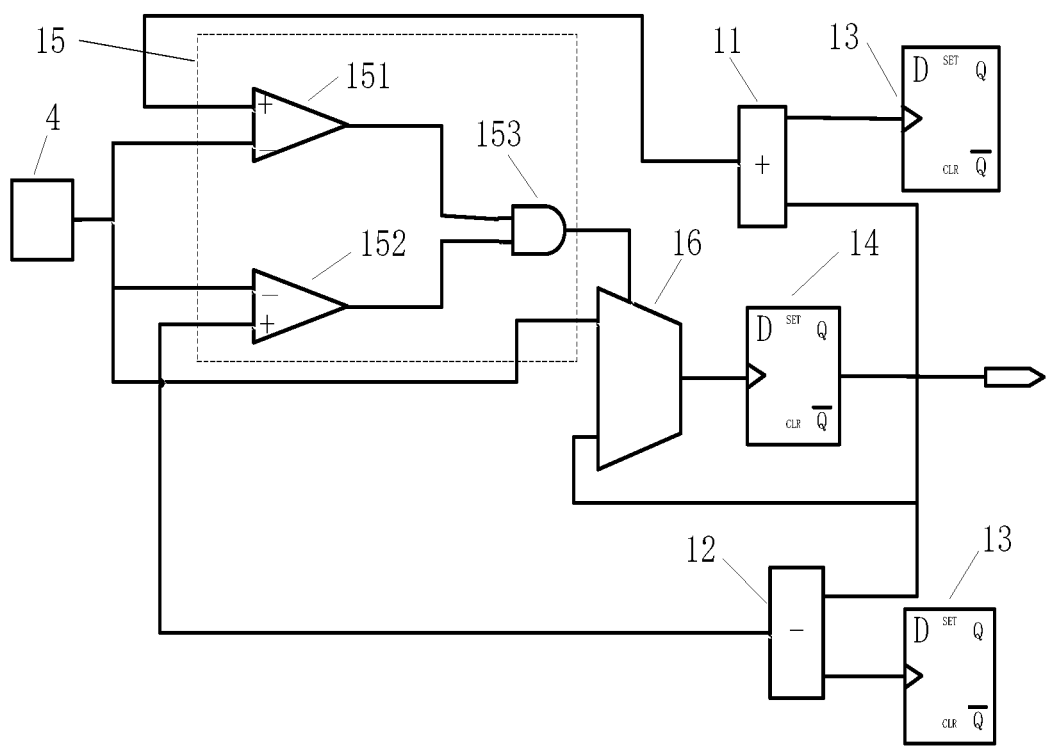
FIG. 5 is a circuit diagram of a judgment unit and a selection unit according to a sixth embodiment.

The sixth embodiment of the present disclosure relates to an apparatus for detecting a background noise of a sensor. The sixth embodiment is mainly detailed on the basis of the fourth embodiment as follows. As shown in FIG. 5, a specific hardware circuit of an apparatus for detecting a background noise of a sensor is provided.

In the present embodiment, the judgment unit 1 comprises a comparison circuit 15, a first adder 11, a subtractor 12, a first register 13, and a second register 14.

The first adder 11 is configured to calculate a sum of a previous background noise sampling value and a half of a background noise channel width, to serve as an upper boundary value of a background noise acceptable range.

The subtractor 12 is configured to calculate a difference between the previous background noise sampling value and a half of the background noise channel width, to serve as a lower boundary value of the background noise acceptable range.

The first register 13 is configured to store the half of the background noise channel width. In the present embodiment, there may be only one first register 13, namely the first register 13 is shared by the first adder 11 and the subtractor 12. Alternatively, there may be two independent first registers 13 (as shown in FIG. 5), connected to the first adder 11 and the subtractor 12 respectively.

The second register 14 is configured to store the previous background noise sampling value.

The comparison circuit 15 is configured to judge whether the sampling value falls within the background noise acceptable range.

Exemplarily, as shown in FIG. 5, the comparison circuit 15 includes a first comparator 151, a second comparator 152 and an AND gate 153. Three input terminals of the comparison circuit 15 are formed by a non-inverting input terminal of the first comparator 151, a non-inverting input terminal of the second comparator 152, and a junction of an inverting input terminal of the first comparator 151 and an inverting input terminal of the second comparator 152 respectively. The three input terminals of the comparison circuit 15 are connected to an output terminal of the first adder 11, an output terminal of the subtractor 12 and a sensor 4 respectively. Output terminals of the first comparator 151 and the second comparator 152 are connected to two input terminals of the AND gate 153 respectively. However, it is not limited thereto during practical application, other circuit forms of the comparison circuit 15 may also be designed, and the present embodiment only makes exemplary descriptions.

In the present embodiment, two input terminals of the first adder 11 are connected to the second register 14 and one of the first registers 13 respectively; two input terminals of the subtractor 12 are connected to the second register 14 and the other first register 13 respectively; and three input terminals of the comparison circuit 15 are connected to the output terminal of the first adder 11, the output terminal of the subtractor 12 and the sensor 4 respectively.

In the present embodiment, the selection unit 2 comprises a selector 16.

The selector 16 is configured to select, when the sampling value falls within the background noise acceptable range, the sampling value as the current background noise sampling value, and output the sampling value to the calculation unit 3 via the second register 14.

In the present embodiment, a control terminal of the selector 16 is connected to an output terminal of the comparison circuit 15 (namely an output terminal of the AND gate 153 in FIG. 5), a first input terminal of the selector 16 is connected to the sensor 4, a second input terminal of the selector 16 is connected to an output terminal of the second register 14, and an output terminal of the selector 16 is connected to an input terminal of the second register 14.

In the present embodiment, a circuit corresponding to the foregoing judgment unit 1 and selection unit 2 may be actually interpreted as a channel filter. Exemplarily, when a sampling value output by the sensor 4 is received, the first comparator 151 and the second comparator 152 perform comparisons. When the sampling value falls within a background noise acceptable range, the first comparator 151 and the second comparator 152 output a high level separately, the AND gate 153 performs AND calculation on output results of the first comparator 151 and the second comparator 152 and outputs a high level. In this case, the selector 16 selects the sampling value provided by the sensor 4 as a current background noise sampling value, and outputs the current background noise sampling value to the calculation unit 3. When the sampling value falls beyond the background noise acceptable range and the AND gate 153 outputs a low level, the selector 16 selects a previous background noise sampling value stored by the second register 14 as a current background noise sampling value, and outputs the current background noise sampling value to the calculation unit 3.

Figure 6:
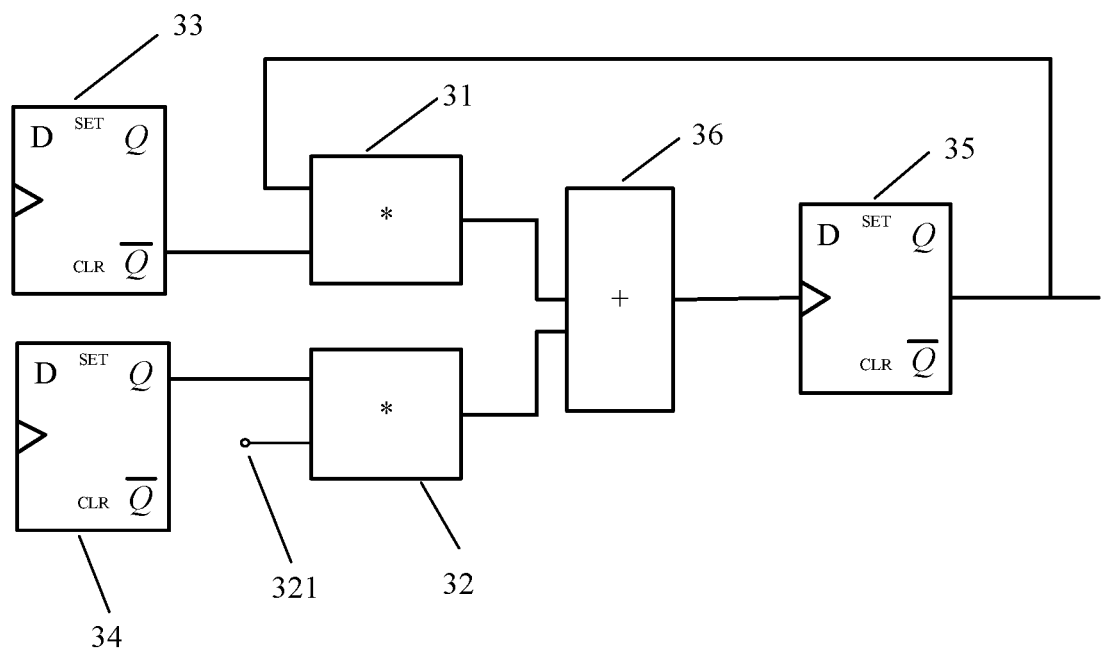
FIG. 6 is a circuit diagram of a calculation unit according to the sixth embodiment.

In the present embodiment, as shown in FIG. 6, the calculation unit 3 includes a first multiplier 31, a second multiplier 32, a third register 33, a fourth register 34, a fifth register 35, and a second adder 36.

The first multiplier 31 is configured to calculate a product of a previous background noise and a weight corresponding to the previous background noise.

The second multiplier 32 is configured to calculate a product of a current background noise sampling value and a weight corresponding to the current background noise sampling value.

In the present embodiment, the first multiplier 31 may alternatively be a first divider and the second multiplier 32 may be a second divider. When the first multiplier 31 is the first divider, the first divider is configured to calculate a quotient of the previous background noise and a reciprocal of the weight corresponding to the previous background noise. When the second multiplier 32 is the second divider, the second divider is configured to calculate a quotient of the current background noise sampling value and a reciprocal of the weight corresponding to the current background noise sampling value.

The third register 33 is configured to store the weight corresponding to the previous background noise.

The fourth register 34 is configured to store the weight corresponding to the current background noise sampling value.

The fifth register 35 is configured to store a current background noise.

The second adder 36 is configured to calculate a sum of a product output by the first multiplier 31 and a product output by the second multiplier 32, to serve as the current background noise, and output the current background noise to the fifth register.

It should be noted that in the present embodiment, the third register 33 and the fourth register 34 may be disposed in the calculation unit 3, so as to freely configure weights. However, it is not limited thereto during practical application; alternatively, the weights may be written into the first multiplier 31 and the second multiplier 32 respectively (but in this mode, the weights cannot be flexibly rewritten).

In the present embodiment, two input terminals of the first multiplier 31 are connected to the fifth register 35 and the third register 33 respectively. An input terminal 321 of the second multiplier 32 is connected to the output terminal of the second register 14, and the other input terminal of the second multiplier 32 is connected to the fourth register 34. Two input terminals of the second adder 36 are connected to output terminals of the first multiplier 31 and the second multiplier 32 respectively, and an output terminal of the second adder 36 is connected to the fifth register 35.

In the present embodiment, a circuit corresponding to the foregoing calculation unit 3 may be actually interpreted as a moving average accumulator for weighted accumulation of output results of a channel filter. That is, the second adder 36 accumulates values respectively output by the first multiplier 31 and the second multiplier 32. When the channel filter detects a new output value, the moving average accumulator performs accumulation once again.

Compared with the fourth embodiment, the present embodiment provides a specific hardware circuit of an apparatus for detecting a background noise of a sensor. Compared with the existing technology, a size of the present circuit is reduced, a circuit structure is simplified, and power consumption of the apparatus is reduced.

It is not difficult to find out that the present embodiment is an apparatus embodiment corresponding to the first embodiment and the present embodiment may be implemented in fit with the first embodiment. Relevant technical details mentioned in the first embodiment are still valid in the present embodiment, and will not be elaborated here in order to reduce repetitions. Correspondingly, relevant technical details mentioned in the present embodiment may also be applied to the first embodiment.

It is worth mentioning that all modules involved in the present embodiment are logical modules. During practical application, a logical unit may be a physical unit, or may be a part of a physical unit, or may be implemented by combining a plurality of physical units. In addition, in order to highlight a creative part of the present disclosure, the present embodiment does not introduce a unit not in a close relationship with a solution for solving the technical problem provided in the present disclosure, but it does not mean that other units do not exist in the present embodiment.

It is understandable to those skilled in the art that all or some steps in the foregoing embodiment method may be completed by instructing relevant hardware via a program, the program being stored in a storage medium comprising a plurality of instructions for enabling a device (a single-chip computer or a chip or the like) or a processor to execute all or some steps of the method according to each embodiment of the present disclosure. The foregoing storage medium comprises: various media capable of storing program codes such as a USB flash disk, a mobile hard disk, a read-only memory (ROM), a random access memory (RAM), a magnetic disk or an optical disk or the like.

It is understandable to those of ordinary skill in the art that each of the foregoing embodiments is a specific embodiment for implementing the present disclosure. During practical application, various changes may be made in form and detail without departing from the spirit and scope of the present disclosure.

What is claimed is:

1. A method for detecting a background noise of a sensor, comprising:
receiving a sampling value output by the sensor, and judging whether the sampling value falls within a background noise acceptable range;
selecting the sampling value as a current background noise sampling value when the sampling value falls within the background noise acceptable range; and
obtaining a current background noise of the sensor by calculating according to a previous background noise and the current background noise sampling value of the sensor, such that a change value of the sensor along with environment changes is updated to the background noise;

wherein an upper boundary value of the background noise acceptable range is a sum of a previous background noise sampling value and a half of a preset background noise channel width; a lower boundary value of the background noise acceptable range is a difference between the previous background noise sampling value and the half of the background noise channel width.

2. The method for detecting a background noise of a sensor according to claim 1, wherein in the step of calculating a current background noise of the sensor according to a previous background noise of the sensor and the current background noise sampling value, a calculation formula for the current background noise is:

$$Base_0=Base_1/N_1+Input_0/N_2, 1/N_1+1/N_2=1,$$

wherein $Base_0$ is representative of the current background noise, $Base_1$ is representative of the previous background noise, $Input_0$ is representative of the current background noise sampling value, $1/N_1$ is representative of a weight corresponding to the previous background noise, and $1/N_2$ is representative of a weight corresponding to the current background noise sampling value.

3. The method for detecting a background noise of a sensor according to claim 1, wherein a calculation formula for the background noise channel width is:

$$W=2*(a+n^\sigma),$$

wherein W is the background noise channel width, a is an environment change limiting speed between two samplings, σ is representative of a normal distribution variance of a background noise, and n is a natural number meeting a safety margin demand.

4. The method for detecting a background noise of a sensor according to claim 1, further comprising:
selecting the previous background noise sampling value as the current background noise sampling value when the sampling value does not fall within the background noise acceptable range.

5. An apparatus for detecting a background noise of a sensor, comprising:
a judgment unit, configured to receive a sampling value output by the sensor, and judge whether the sampling value falls within a background noise acceptable range; wherein an upper boundary value of the background noise acceptable range is a sum of the previous background noise sampling value and a half of a preset background noise channel width; a lower boundary value of the background noise acceptable range is a difference between the previous background noise sampling value and the half of the background noise channel width;
a selection unit, configured to select, when the sampling value falls within the background noise acceptable range, the sampling value as a current background noise sampling value; and
a calculation unit, configured to obtain a current background noise of the sensor by calculating according to a previous background noise and the current background noise sampling value of the sensor, such that a change value of the sensor along with environment changes is updated to the background noise.

6. The apparatus for detecting a background noise of a sensor according to claim 5, wherein the judgment unit comprises a first adder, a subtractor, a first register for storing a half of a background noise channel width, a comparison circuit, and a second register for storing a previous background noise sampling value;
wherein two input terminals of the first adder are connected to the first register and the second register respectively, the first adder is configured to calculate a sum of the previous background noise sampling value and the half of the background noise channel width, to serve as an upper boundary value of the background noise acceptable range;
two input terminals of the subtractor are connected to the first register and the second register respectively; the subtractor is configured to calculate a difference between the previous background noise sampling value and the half of the background noise channel width, to serve as a lower boundary value of the background noise acceptable range; and
three input terminals of the comparison circuit are connected to an output terminal of the first adder; an output terminal of the subtractor and the sensor respectively; the comparison circuit is configured to judge whether the sampling value falls within the background noise acceptable range.

7. The apparatus for detecting a background noise of a sensor according to claim 6, wherein the selection unit comprises a selector,
wherein a control terminal of the selector is connected to an output terminal of the comparison circuit, a first input terminal of the selector is connected to the sensor, a second input terminal of the selector is connected to an output terminal of the second register, and an output terminal of the selector is connected to an input terminal of the second register; the selector is configured to select, when the sampling value falls within the background noise acceptable range, the sampling value as the current background noise sampling value, and output the sampling value to the calculation unit via the second register.

8. The apparatus for detecting a background noise of a sensor according to claim 7, wherein the calculation unit comprises a first multiplier, a second multiplier, a third register for storing a weight corresponding to the previous background noise, a fourth register for storing a weight corresponding to the current background noise sampling value, a second adder, and a fifth register for storing the current background noise;
wherein two input terminals of the first multiplier are connected to the fifth register and the third register respectively; the first multiplier is configured to calculate a product of the previous background noise and the weight corresponding to the previous background noise;
two input terminals of the second multiplier are connected to the output terminal of the second register and the fourth register respectively; the second multiplier is configured to calculate a product of the current background noise sampling value and the weight corresponding to the current background noise sampling value; and
two input terminals of the second adder are connected to output terminals of the first multiplier and the second multiplier respectively, and an output terminal of the second adder is connected to the fifth register; the second adder is configured to calculate a sum of the product output by the first multiplier and a product output by the second multiplier to serve as the current background noise, and output the current background noise to the fifth register.

9. The apparatus for detecting a background noise of a sensor according to claim 5, wherein when the calculation unit calculates the current background noise according to the previous background noise and the current background noise sampling value, a calculation formula for the current background noise is:

$$Base_0=Base_1/N_1+Input_0/N_2, 1/N_1+1/N_2=1,$$

wherein $Base_0$ is representative of the current background noise, $Base_1$ is representative of the previous background noise, $Input_0$ is representative of the current background noise sampling value, and $1/N_1$ and $1/N_2$ are respectively representative of weights corresponding to the previous background noise and the current background noise sampling value.

10. The apparatus for detecting a background noise of a sensor according to claim 5, wherein a calculation formula for the background noise channel width is:

$$W=2*(a+n\sigma),$$

W is representative of the background noise channel width, a is representative of an environment change limiting speed between two samplings, $\sigma$ is representative of a normal distribution variance of a background noise, and n is representative of a natural number meeting a safety margin demand.

11. An apparatus for detecting a background noise of a sensor, comprising:
a processor, and
a memory, communicably with the processor;
wherein the memory stores a computer program instruction; and the computer program instruction, when executed by the processor, implements a method for detecting a background noise of a sensor, comprising:
receiving a sampling value output by the sensor, and judging whether the sampling value falls within a background noise acceptable range;
selecting the sampling value as a current background noise sampling value when the sampling value falls within the background noise acceptable range; and
obtaining a current background noise of the sensor by calculating according to a previous background noise and the current background noise sampling value of the sensor, such that a change value of the sensor along with environment changes is updated to the background noise;
wherein an upper boundary value of the background noise acceptable range is a sum of a previous background noise sampling value and a half of a preset background noise channel width; a lower boundary value of the background noise acceptable range is a difference between the previous background noise sampling value and the half of the background noise channel width.

12. The apparatus for detecting a background noise of a sensor according to claim 11, wherein in the step of calculating a current background noise of the sensor according to a previous background noise of the sensor and the current background noise sampling value, a calculation formula for the current background noise is:

$$Base_0=Base_1/N_1+Input_0/N_2, 1/N_1+1/N_2=1,$$

wherein $Base_0$ is representative of the current background noise, $Base_1$ is representative of the previous background noise, $Input_0$ is representative of the current background noise sampling value, $1/N_1$ is representative of a weight corresponding to the previous background noise, and $1/N_2$ is representative of a weight corresponding to the current background noise sampling value.

13. The apparatus for detecting a background noise of a sensor according to claim 11, wherein a calculation formula for the background noise channel width is:

$$W=2*(a+n\sigma),$$

wherein W is the background noise channel width, a is an environment change limiting speed between two samplings, $\sigma$ is representative of a normal distribution variance of a background noise, and n is a natural number meeting a safety margin demand.

14. The apparatus for detecting a background noise of a sensor according to claim 11, wherein the method further comprises:
selecting the previous background noise sampling value as the current background noise sampling value when the sampling value does not fall within the background noise acceptable range.

* * * * *